United States Patent [19]
Deland, Jr., Robert S. et al.

[11] Patent Number: 5,396,369
[45] Date of Patent: Mar. 7, 1995

[54] DEGAUSSER FOR MAGNETIC STRIPE CARD TRANSDUCING SYSTEM

[75] Inventors: Deland, Jr., Robert S., Torrance, Calif.; Richard P. Manning, Hixson, Tenn.

[73] Assignees: Debitek, Inc., Chattanooga, Tenn.; Magtek, Inc., Carson, Calif.

[21] Appl. No.: 111,220

[22] Filed: Aug. 24, 1993

[51] Int. Cl.6 ............................................. G11B 25/04
[52] U.S. Cl. ......................................... 360/2; 360/46
[58] Field of Search .................... 360/2, 46, 66, 57, 67; 235/449, 450; 307/571

[56] References Cited

U.S. PATENT DOCUMENTS

| | | | |
|---|---|---|---|
| 3,471,862 | 10/1969 | Barney | 235/450 X |
| 4,471,403 | 9/1984 | Dress, Jr. et al. | 361/149 |
| 4,651,235 | 3/1987 | Morita et al. | 360/46 |
| 4,787,002 | 11/1988 | Isozaki | 360/66 X |
| 4,956,728 | 9/1990 | Hayata et al. | 360/66 |
| 4,970,621 | 11/1990 | Gailbreath et al. | 360/66 X |
| 5,220,476 | 6/1993 | Godwin et al. | 360/60 |

Primary Examiner—Donald Hajec
Assistant Examiner—Le, Thien Minh
Attorney, Agent, or Firm—Nilsson, Wurst & Green

[57] ABSTRACT

A device for degaussing magnetic transducers used with magnetic stripe cards includes a degaussing unit that drives a magnetic transducer with an electrical pulse, or a gradually increasing drive frequency, to eliminate the residual magnetism of the transducer. Logic-circuitry controls the device to degauss with little or no additional equipment and avoids damage to the recordings, as on low-coercivity magnetic stripe cards.

8 Claims, 4 Drawing Sheets

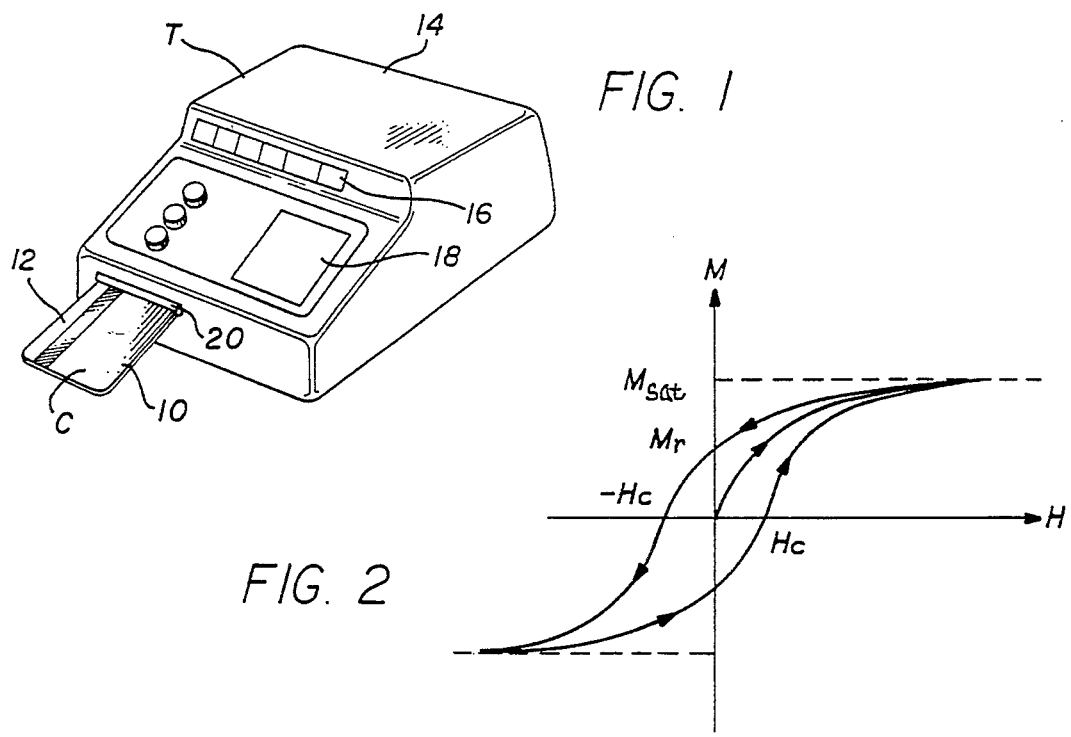
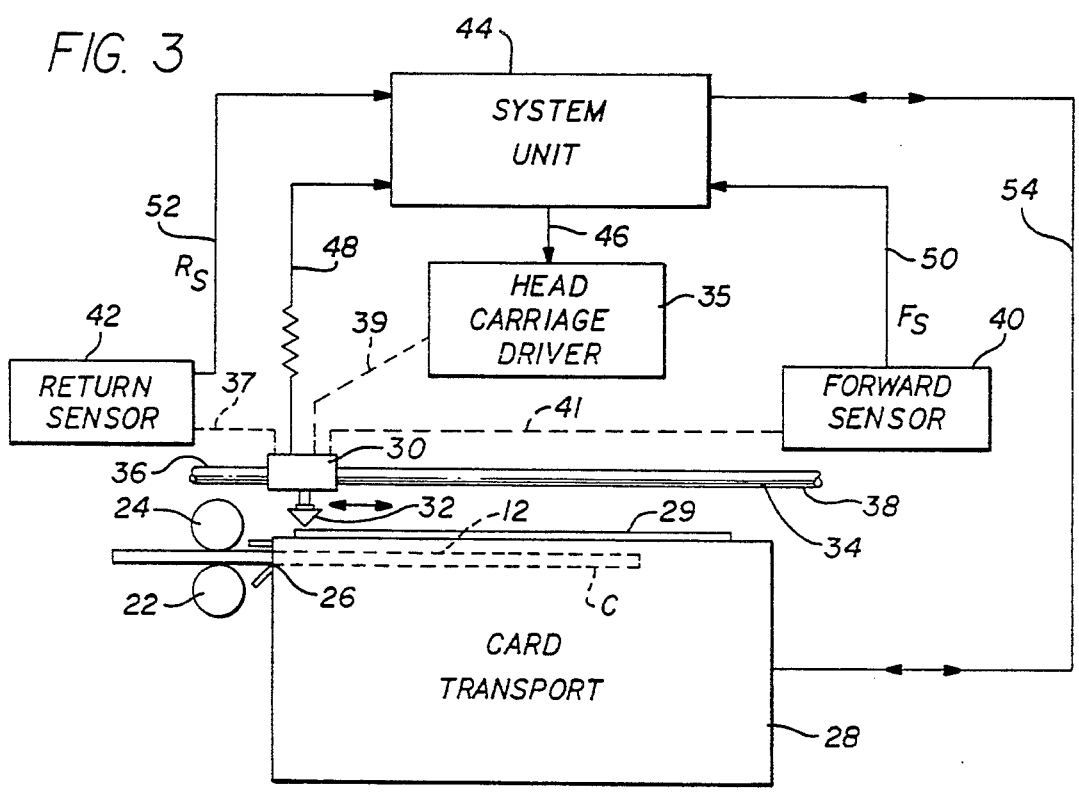

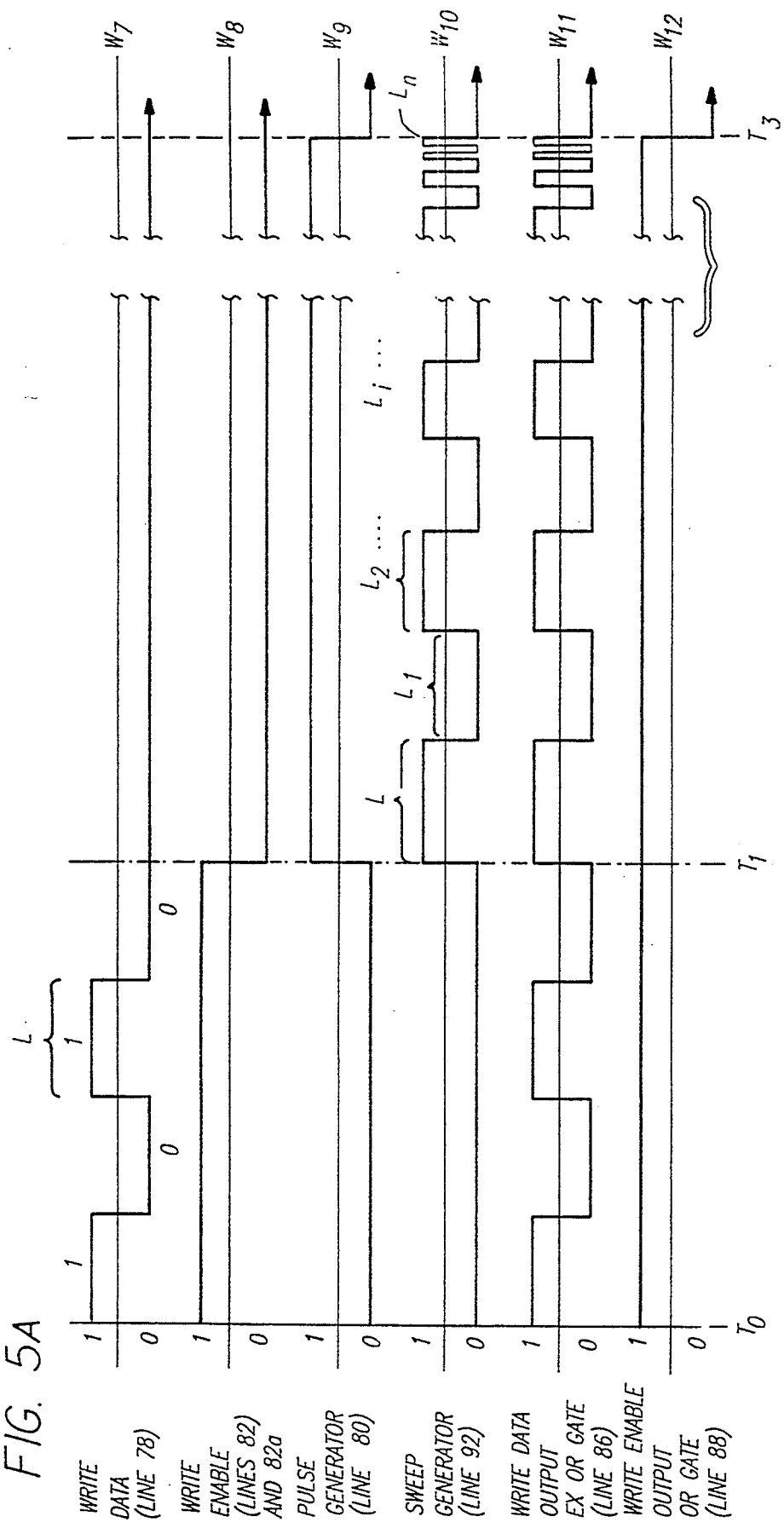

DEGAUSSER FOR MAGNETIC STRIPE CARD TRANSDUCING SYSTEM

FIELD OF THE INVENTION

This invention relates to the field of degaussing, that is, clearing residual magnetism from objects that are magnetizable. In particular, this invention relates to degaussing magnetic transducers used with magnetic stripe cards.

BACKGROUND AND SUMMARY OF THE INVENTION

Various forms of plastic identification cards bearing a stripe of magnetic medium have come into widespread use. Particularly, magnetic stripe cards have been used to access various systems ranging from automated teller machines to credit verification machines. Equipped with magnetic transducers for sensing magnetic stripes, these systems readily sense the magnetic stripe cards for retrieving and storing data.

Like ferro-magnetic materials in general, the core of a magnetic head may exhibit hysteresis when exposed to high field strengths and retain a net remanent magnetization, even when the magnetizing field intensity is zero. Consequently, a coercive field is required to bring the magnetization back to zero.

Various magnetic cards are in widespread use, some being more desirable than others. Specifically, magnetic cards requiring greater magnetizing fields are highly desirable in that they afford better resistance to demagnetization. The magnetic cards in this category are known as "high-coercivity" cards, in contrast to "low-coercivity" cards, and the former provides for magnetic stripes having 600 or more oersteds.

Typically, modern magnetic stripe card transducers (heads) are designed for processing high-coercivity cards and retain a significant residual magnetism. Such residual magnetism is known to damage the records on low-coercivity cards during subsequent processing.

The need to degauss magnetic transducers or magnetic heads has been recognized in the past. Various past techniques include exposing the heads to alternating magnetic field of decreasing intensity or directing an exponentially decaying alternating current signal through the windings of the head itself. However, such techniques are not conventionally used to degauss magnetic transducers for sensing magnetic stripe cards. With respect to magnetic stripe cards, it is desirable to accomplish degaussing with low cost in a digital system. Thus, a need exists for a system incorporating a magnetic transducer degausser, which system degausses with little or no additional equipment and avoids damage to the recordings on low-coercivity magnetic stripe cards.

The present invention is based on recognizing a desirable magnetic transducer for reading a magnetic-stripe card of either high or low coercivity without erasing, or otherwise damaging, information stored on low-coercivity magnetic stripes. Specifically, the present invention incorporates a degaussing unit which for example, exposes a magnetic transducer to an electrical pulse, or a gradually increasing drive frequency, to cancel the residual magnetism of the transducer.

DESCRIPTIONS OF THE DRAWINGS

In the drawings, which constitute a part of this specification, exemplary embodiments demonstrating various objects and features hereof are set forth as follows:

FIG. 1 is a perspective view of an apparatus using an embodiment of the present invention illustrated along with a magnetic stripe card;

FIG. 2 is a hysteresis curve showing a net remanent or residual magnetization;

FIG. 3 is a block and schematic diagram showing a system for reading and writing on a magnetic stripe card constructed in accordance with and incorporating the present invention, illustrated along with a magnetic stripe card;

FIG. 5A is waveforms of various signals occurring throughout the component of FIG. 5.

DESCRIPTION OF THE ILLUSTRATIVE EMBODIMENT

Figure 4:
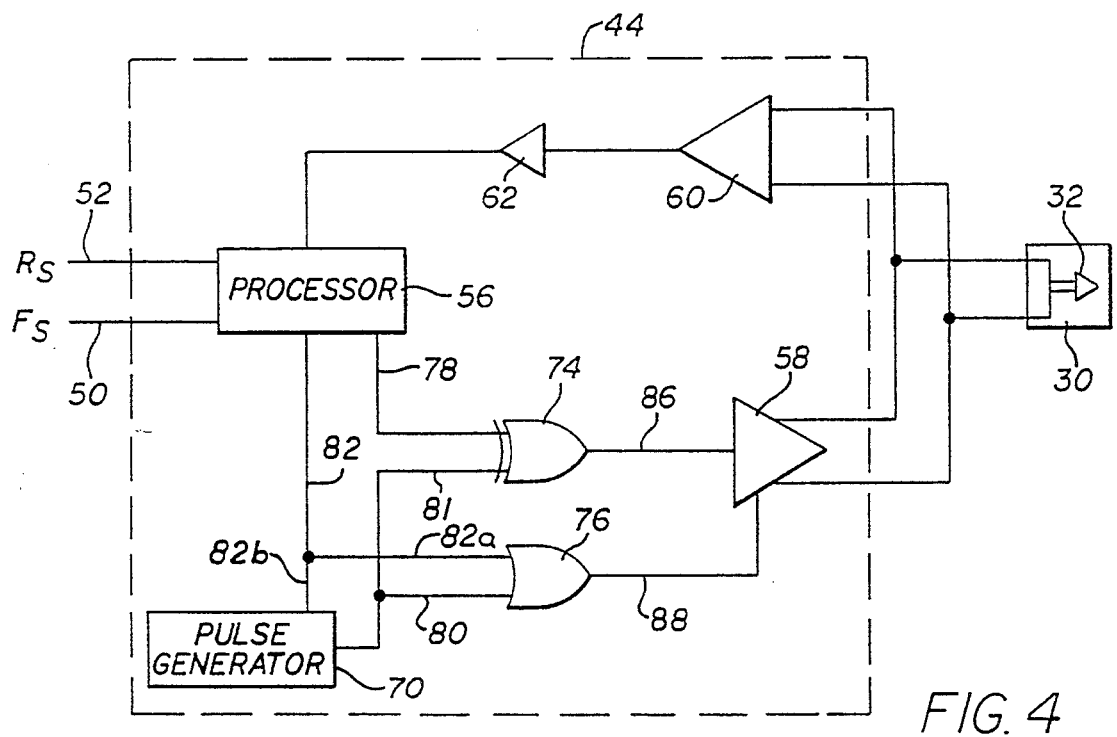
FIG. 4 is a block and logic diagram illustrating a component of the system of FIG. 1.

As indicated above, a detailed illustrative embodiment is disclosed herein. However, systems for accomplishing the objectives of the present invention may be detailed quite differently from the disclosed embodiment. Consequently, specific structural and functional details disclosed herein are merely representative; yet, in that regard, they are deemed to afford the best embodiment for purposes of disclosure and to provide a basis for the claims herein which define the scope of the present invention.

Referring initially to FIG. 1, an exemplary magnetic card transducing machine T is illustrated for use in cooperation with a magnetic stripe card C. The machine T incorporates structure as disclosed below to embody the present invention. The machine T may be specifically designed for a variety of predetermined operations relating to the use of the magnetic card C. Exemplary read and write operations include initial card preparation as well as various transactional operations as described below.

The magnetic stripe card C may be of a conventional form; several of which are currently in widespread use, and which essentially comprise a plastic sheet 10 supporting a magnetic stripe 12 that may have a characteristic of either high or low coercivity. In one well known application, magnetic stripe cards are used in a customer-teller situation to expedite financial transactions.

The machine T incorporates a housing 14, which exposes a display panel 16, a control panel 18, and a slot 20 which receives the magnetic stripe card C as illustrated. In use, the card C is placed in the slot 20 and drawn into the machine T to be transduced (read and recorded) with regard to data on the magnetic stripe 12. In accordance with the present system, the machine T may be effectively used with magnetic stripe cards bearing magnetic stripes of both high and low coercivity.

To consider the interior structure of the machine T, reference will now be made to FIG. 3. A pair of rollers 22 and 24 (left) draw the card C through a card entry port 26 into a card transport 28 wherein the card C is positioned on a platform 29 for processing. A read/-write head assembly 30 having one or more transducers (heads) are provided for communication with the magnetic stripe 12. For exemplary purposes, the head assembly 30 shown in FIG. 3 has one transducer (head) 32 for both reading and writing operations.

To scan the magnetic stripe 12, the head 32 is moved relatively along the magnetic stripe 12, remaining proximate thereto, to read stored data or to write fresh data. In one embodiment, a head carriage rod 34 supports the head assembly 30 in order to move the head 32 along the platform 29. The head assembly 30, equipped with the head 32, rests on the head carriage rod 34 while a head carriage driver 35 controls lateral movement of the head assembly 30 along the head carriage rod 34 from one end 36 to the other end 38. Note that connections are presented by dashed lines 37, 39 and 41 from the head assembly 30 to a return sensor 42, to the head carriage driver 35, and to a forward sensor 40, respectively. The lines 37, 39 and 41 may be any of a variety of connections, including, electrical, mechanical, optical, magnetic, etc., which enables the system to function as described herein. For example, the line 39 may be a mechanical connection for providing lateral movement of the head assembly 30 along the head carriage rod 34. On the other hand, the lines 37 and 41 may be optical connections which provide optical sensors that are triggered when the head assembly 30 substantially reaches the carriage rod ends 36 and 38. With the head assembly 30 so connected, motion of the head assembly 30 completes a full cycle when the head carriage driver 35 moves the head assembly 30 from the end 36 to the other end 38, and then back to the end 36.

It is to be understood that the scanning process merely requires relative movement between the head 32 and the magnetic stripe 12. As well known in the art, the magnetic stripe 12 also may be scanned in a manner where the head 32 remain stationary while the card C bearing the magnetic stripe 12 is moved with respect to the head 32.

There are various operations well known in the art which may be implemented for reading and writing data on the mag-stripe card C. Generally, an initial stroke may be characterized as a forward or reading stroke where the head 32 is enabled to read stored data from the magnetic stripe 12. For exemplary purposes, the forward stroke herein describes motion of the head assembly 30 being driven from the carriage rod end 36 to the carriage rod end 38. Similarly, a stroke where the head assembly 30 is driven from the carriage rod end 38 back to the carriage rod end 36 may be characterized as a return or writing stroke where the head 32 is enabled to write fresh data on the magnetic stripe 12.

With motion of the head assembly 30 being described as such, the forward sensor 40 and the return sensor 42 are provided to sense motion of the head assembly 30. In particular, the forward sensor 40 indicates by a signal when the head assembly 30 is substantially at the carriage rod end 38. Likewise, the return sensor 42 indicates by a signal when the head assembly 30 is substantially at the carriage rod end 36.

Reading and writing operations of the machine T are controlled by a system unit 44. In the disclosed embodiment for exemplary purposes, the system unit 44 is electrically connected to various mechanisms, including the head carriage driver 35 via a line 46, the head assembly 30 via head cable 48, the forward sensor 40 via a line 50, the return sensor 42 via line 52 and the card transport 28 via a line 54.

The system unit 44 coordinates sensing of the card C through electrical signals with the head carriage driver 35 while communicating digital signals to the head 32 to read or write data on the magnetic stripe 12.

Of course, as well known in the art, recording data on a magnetic stripe involves residual magnetism. Referring to FIG. 2, the phenomenon of residual magnetism is demonstrated by a hysteresis curve. The hysteresis curve is defined by a vertical axis representing remanent magnetization M and a horizontal axis representing an applied magnetic field H. Typical ferromagnetic materials exhibit hysteresis where the magnetization saturates ($M_{sat}$) at high field strengths and retains a net remanent or residual magnetization ($M_r$) even when H is zero. A coercive field ($-H_c$) is required to bring the magnetization back to zero.

Further referring to FIG. 2, in relations to magnetic transducers, when the head 32 is driven by a high magnetic field H such as that required for storing or writing data on high-coercivity cards, the magnetization M of the head 32 reaches saturation ($M_{sat}$). However, due to hysteresis, as the driving magnetic field H diminishes and returns to zero, the head 32 remains magnetized with residual magnetism ($M_r$).

For cards having high-coercivity magnetic stripes that are sensed by the head 32, the residual magnetism ($M_r$) retained on the head 32 from a previous writing operation is of insufficient strength to adversely affect such cards. However, the residual magnetism ($M_r$) often is strong enough to erase or damage magnetic data stored on cards having low-coercivity magnetic stripes. Recognizing the need to avoid such damage, the present invention degausses the head 32, for example, by utilizing a pulse generator or a sweep generator.

Figure 5:
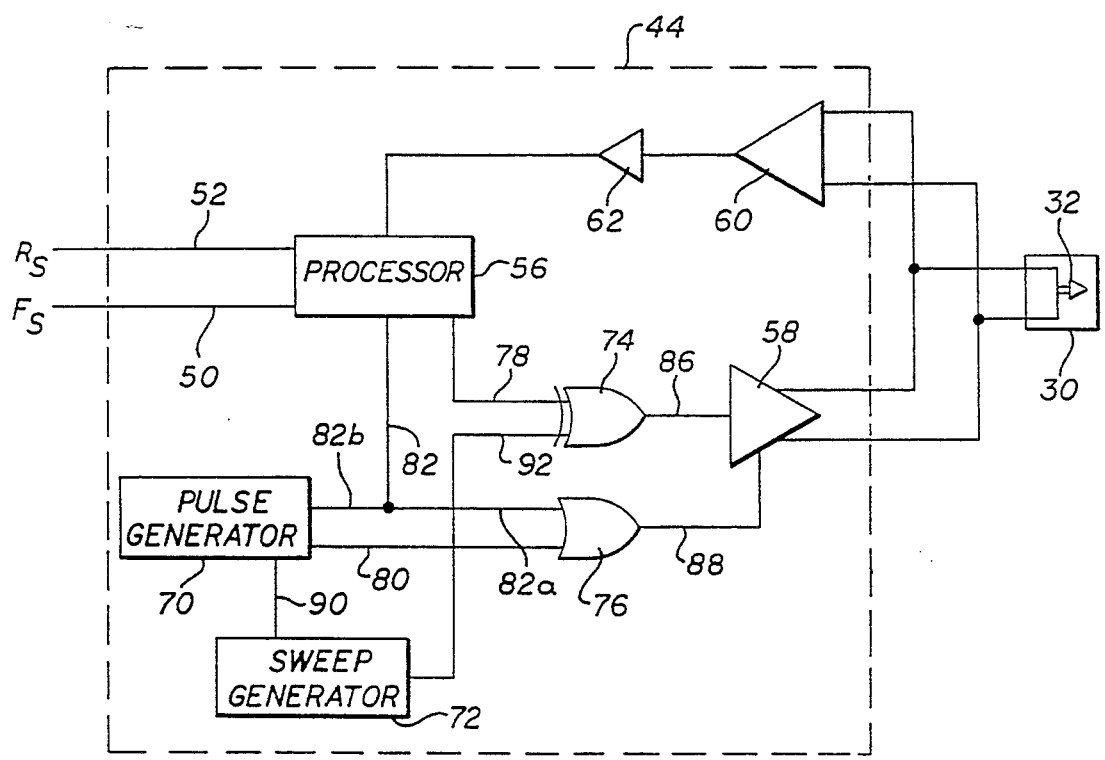
FIG. 5 is a block and logic diagram illustrating an alternative component of the system of FIG. 1.

Referring now to FIGS. 4 and 5, using binary digital signals, the system unit 44 controls reading, writing and degaussing operations. The system unit 44 includes a processor 56, a head drive 58, an analog amplifier 60 and a digital amplifier 62. Note that similar components in the detailed structures of FIGS. 4 and 5 bear the same reference numerals.

In the disclosed embodiment, for exemplary purposes, the digital signals are binary and bipolar, that is, have positive and negative polarity. As described in detail below, the bipolar digital signals enable the head drive 58 for both writing and degaussing operations. Note however, that the binary signals may also be of a single common polarity but are distinguished by a difference in direction of application. Such signals may also be implemented in the system in manners well known to the art.

For reading operations wherein stored data is read off the magnetic stripe 12, the system unit 44 controls the head 32 in manners well known in the art, to scan the magnetic stripe 12 (FIG. 3) on a forward stroke. Magnetic bit signals stored on the magnetic stripe 12 are sensed by the head 32, and signals representing the stored data are sent from the head assembly 30 to the system unit 44 incorporating the processor 56. In particular, prior to processing by the processor 56, the signals representing the stored data are amplified by the analog amplifier 60 and the digital amplifier 62.

For writing operations where fresh data is written on the magnetic stripe 12 during a return stroke, the processor 56 drives the head 32 in a manner well known in the art to magnetically record fresh data on the magnetic stripe 12. In the disclosed embodiment, while the processor 56 sends write-data signals representing fresh data to the head drive 58, the processor 56 also sends write-enable signals to the head drive 58 for amplifying the write-data signals.

Once the fresh data has been magnetically recorded on the magnetic stripe 12, the card C (FIG. 1) is updated. In a subsequent reading operation, the data may be verified, retrieved, or otherwise read off the magnetic stripe 12.

In accordance herewith, distinct from a writing operation that often leaves a residual magnetism on the magnetic transducers, a degaussing operation is provided by the present system for degaussing the head 32 to substantially reduce the residual magnetism.

To avoid damage from residual magnetism, the system unit 44 includes either a pulse generator 70 (FIG. 4), or a sweep generator 72 (FIG. 5) for degaussing the head 32. In the former instance, the pulse generator 70 generates a pulse opposite in polarity to the residual magnetism induced on the head 32 by a writing operation. To degauss in the latter instance, the sweep generator 72 (FIG. 5) applies a signal of increasing frequency which begins at a normal data interval, and attains a frequency that exceeds the frequency response of the head 32.

Referring specifically to FIG. 4, where the system degausses by a pulse signal, the pulse generator 70 is provided in conjunction with an Exclusive-OR gate 74 and an OR gate 76. The pulse generator 70 is connected to the processor 56 via lines 82 and 82b. The Exclusive-OR gate 74 receives write-data bit signals from the processor 56 via a line 78 and a pulse from the pulse generator 70 via a line 81. The OR gate 76 receives the pulse from the pulse generator 70 via a line 80, as well as write-enable signals from the processor 56 via the line 82 and a line 82a. During routine record operations, write-enable output of the OR gate 76 qualifies the head drive 58 to amplify the write-data output from the Exclusive-OR gate 74 for recording fresh data on the magnetic stripe 12. For degaussing operations, the Exclusive-Or gate 74 and the Or gate 76 pass signals from the pulse generator 70 to qualify the head drive 58.

Figure 4A:
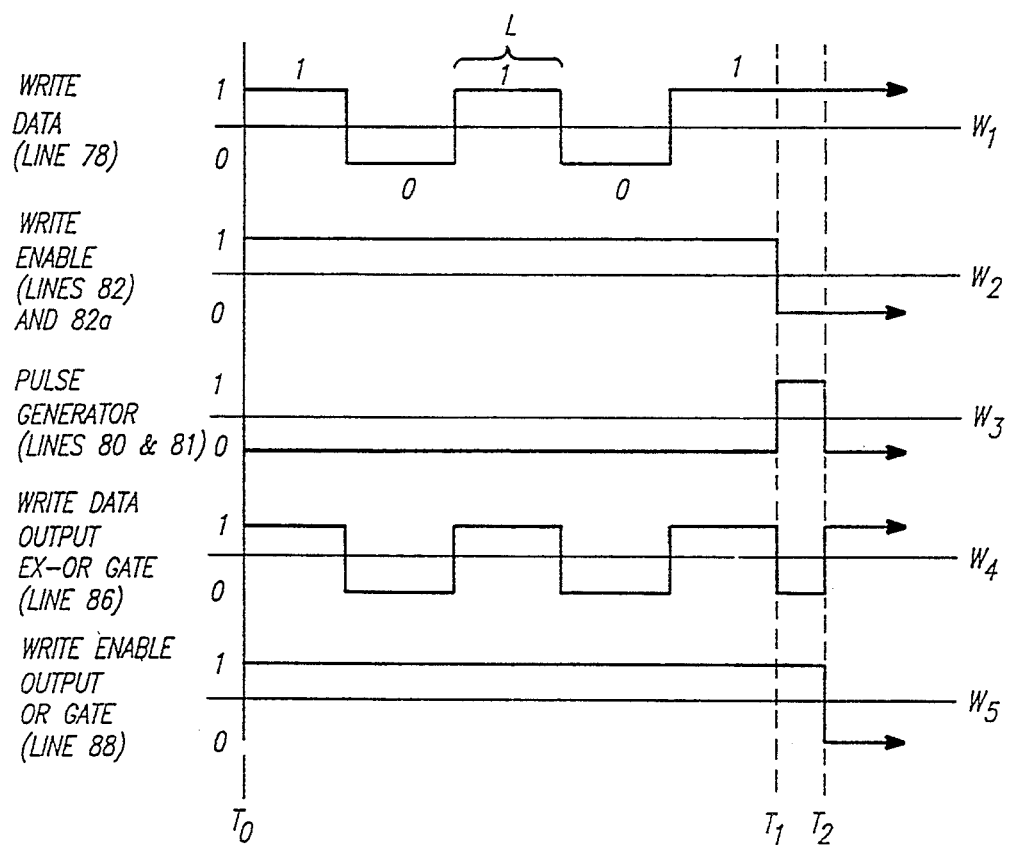
FIG. 4A is waveforms of various signals occurring throughout the component of FIG. 4.

FIG. 4A shows waveforms for various signals in the logic circuitry of FIG. 4 during the writing and degaussing operations. In particular, a waveform $W_1$ shows the write-data signals sent from the processor 56 via the line 78 to the Exclusive-OR gate 74. Waveform $W_2$ shows the write-enable signals from the processor 56 via the lines 82 and 82a to the OR gate 76. Waveform $W_3$ shows the pulse from the pulse generator 70 via the lines 80 and 81 to the OR gate 76 and the Exclusive-OR gate 74, respectively. Waveform $W_5$ shows the write-enable output of the OR gate 76, via a line 88, which drives the head drive 58 for amplifying the write-data output of the Exclusive-OR gate 74 via a line 86 shown on waveform $W_4$.

In general, the head assembly 30 performs writing operations during a return stroke. To write the fresh data on the magnetic stripe 12, the processor 56 transmits or sends write-data signals representing the fresh data to the head drive 58 through the Exclusive-OR gate 74 via the lines 78 and 86. The write-data signals are transmitted at the normal data interval, L, which is shown in FIG. 4A (see $W_1$) to be a constant, for exemplary purposes.

While transmitting the write-data signals, the processor 56 simultaneously transmits write-enable signals to the head drive 58 through OR gate 76 via the lines 82, 82a and 88. Being driven by the write-enable output of the OR gate 76, the head drive 58 amplifies the write-data signals so that the head 32 can magnetically record the fresh data on the magnetic stripe 12.

In accordance with Boolean Algebra as well known and shown in Tables I and II below, the write-enable signals are implemented in a manner for enabling the writing operation of the logic circuitry shown in FIGS. 4 and 5. Specifically, the write-enable signals are kept positive, or high, i.e., "1111 . . . ", as shown on waveforms $W_2$ (FIG. 4A) and $W_8$ (FIG. 5A), throughout transmission of the fresh data from time $T_0$ to $T_1$.

TABLE I

| Exclusive-OR gates | | |
|---|---|---|
| input a | input b | output |
| 0 | 0 | 0 |
| 0 | 1 | 1 |
| 1 | 0 | 1 |
| 1 | 1 | 0 |

TABLE II

| OR gates | | |
|---|---|---|
| input a | input b | output |
| 0 | 0 | 0 |
| 0 | 1 | 1 |
| 1 | 0 | 1 |
| 1 | 1 | 1 |

Immediately following the transmission of the fresh data, the processor 56 further transmits at the normal data interval as additional write-data signals, a trailer pattern to mark the end of the fresh data on the magnetic stripe 12. In general, once the fresh data has been stored on the magnetic stripe 12, the trailer pattern facilitates a subsequent reading operation for retrieving and confirming the stored data off the magnetic stripe 12. The trailer pattern may be any pattern recognizable as a marker of some sort. In the disclosed embodiment, the trailer pattern is a pattern of alternating negative and positive signals, i.e., "0101 . . . ", as shown on the waveform $W_1$.

The processor 56 continues to transmit the trailer pattern until it receives a signal from the return sensor 42 (FIG. 3) via the line 52, indicating that the head assembly 30 is substantially at the carriage rod end 36. In FIG. 4A, the head assembly 30 reaches the carriage rod end 36 substantially at or prior to the time $T_1$. Upon receiving the return sensor signal via the line 52, the processor 56 begins the degaussing operation.

At the onset of the degaussing operation, the processor 56 discontinues transmission of the positive write-enable signals via the line 82 to discontinue the writing operation (see $W_2$). Where the return sensor signal occurs in midbit, the processor 56 waits for a completion of transmission of the last write-data bit signal (whether "1" or "0") prior to discontinuing the positive write-enable signals. As shown in FIG. 4A (see $W_1$), the last transmitted bit signal is a "1" of the trailer pattern and its transmission is completed at time $T_1$. By waiting until the time $T_1$ to discontinue the positive write-enable signals, the system unit 44 causes the head 32 to be substantially saturated, thereby leaving a residual magnetism of a certain magnitude on the head 32.

Also at the time $T_1$, the processor 56 discontinues transmission of the trailer pattern, and instead, sustains as the write-data signals, the last transmitted bit signal of the trailer pattern. Accordingly, as the transmitted bit signal of the trailer pattern is "1" the processor 56 sustains the signal "1" as the write-data signals beyond the time $T_1$ (see $W_1$).

Additionally at $T_1$, the processor 56 signals the pulse generator 70 via the lines 82 and 82b to generate a pulse (see $W_3$). The pulse is transmitted to the Exclusive-OR gate 74 via the line 81 and to the OR gate 76 via the line 80. As shown on the waveform $W_3$, the pulse is positive and has a predetermined duration of, or width from, the time $T_1$ to time $T_2$. The width of the pulse is in accordance with the magnitude of the residual magnetism on the head 32, so as to sufficiently eliminate the residual magnetism. Note that the pulse duration or width in FIG. 4A is not to scale in relation to the interval L, but rather, merely illustrative of the waveform involved.

To apply a pulse of opposite polarity for degaussing, it is necessary to reverse the polarity of the last transmitted bit signal. As shown in Boolean Table I of FIG. 6, logic of the Exclusive OR-gate 74 is such that it automatically reverses or flips the last transmitted bit signal during the positive pulse between $T_1$ and $T_2$. In flipping the last transmitted bit signal, the Exclusive-OR gate 74 allows the head 32 to be exposed to a pulse of a opposite polarity, thereby degaussing the head 32. Specifically, as waveform $W_1$ shows the last recorded bit signal to be positive or high, i.e., "1" at $T_1$, and accordingly, the sustained write-data signal to be "1" after $T_1$, the logic of the Exclusive-OR gate 74 is such that the write-data output via the line 86 is negative or low, i.e. "0" as shown on waveform $W_4$ between $T_1$ and $T_2$.

From $T_1$ to $T_2$, it is also necessary to ensure that the head drive is enabled so that the negative pulse is amplified, or otherwise applied to the head 32. As shown in Boolean Table II above, logic of the OR gate 76 is such that head drive 58 remains driven from $T_1$ to $T_2$. Specifically, the pulse input via the line 80 renders the write-enable output to remain positive from $T_1$ to $T_2$, even though the processor 56 has previously ceased transmission of the positive write-enable input via the line 82 at $T_1$. As shown on the waveform $W_5$, the write-enable output driving the head drive 58 via the line 88, remains positive past $T_1$, until $T_2$.

As shown in FIG. 4A, the degaussing operation concludes at $T_2$. At this time, the processor 56 may initiate a reading operation for verifying the fresh data stored on the magnetic stripe 12.

It is to be noted that the degaussing operation of the system as shown in FIG. 4, is such that the head 32 is always driven by a pulse opposite in polarity to that of the last transmitted write-data bit signal, whether it is positive or negative, and whether it is part of the trailer pattern or the fresh data. Moreover, as intimated earlier, the width of the pulse may be different for systems with different data intervals, write time constants or different magnetic material.

Now, referring in detail to FIG. 5, another embodiment of the present invention utilizes the sweep generator 72 to apply a signal increasing in frequency to degauss the head 32. In contrast to the embodiment of FIG. 4, the sweep generator 72 is connected via line 90 to the pulse generator 70, which in turn, is connected to both the processor 56 via the lines 82 and 82b, and the OR gate 76 via the line 80. In contrast to the embodiment shown in FIG. 4, the pulse generator 70 no longer provides write-data signals to the Exclusive-OR gate 74. Rather, the Exclusive-OR gate 74 receives as write-data input, the increasing frequency, or sweep, signal from the sweep generator 72 via a line 92.

FIG. 5A shows waveforms of various signals in the logic circuitry of FIG. 5 that occur during the writing and degaussing operations. In particular, waveform $W_7$ represents the write-data input of the Exclusive-OR gate 74 via the line 78 from the processor 56. Waveform $W_8$ shows the write-enable input to the OR gate 76 via the lines 82 and 82a from the processor 56. Waveform $W_9$ shows the pulse input from the pulse generator 70 to the OR gate 76 via the line 80. Waveform $W_{10}$ shows the write-data input to the Exclusive-OR gate 74 via the line 92. Waveform $W_{12}$ shows the write-enable output of the OR gate 76 via the line 88 which drives the head drive 58 for amplifying the write-data output of the Exclusive-OR gate 74 via the line 86, as shown on Waveform $W_{11}$.

In general, the writing operation of the logic circuit of FIG. 5 mirrors that of FIG. 4. Likewise, as described above, after receiving the return sensor signal via the line 52, the processor 56 of FIG. 5 initiates the degaussing operation of the present invention after the last write-data bit signal has been completely transmitted. As shown in FIG. 5, the last transmitted bit signal is "0" (or negative). As such, the processor 56 awaits completion of the transmission prior to ceasing transmission of the write-enable signals to the Exclusive-Or gate 74. Again, this causes substantial saturation of the head 32, leaving a residual magnetism of a certain magnitude on the head 32.

In contrast to the degaussing operation of the embodiment represented in FIG. 4, it is not necessary that the processor 56 of FIG. 5 sustains as the digital write-data signals the last transmitted bit signal. Because the alternative embodiment applies a sweep signal, the sweep signal need not be opposite in polarity to the last transmitted bit signal. For exemplary purposes, however, the processor 56 is shown sustaining the write-data signal as "0" (waveform $W_7$) beyond $T_1$, and to $T_3$.

To apply the sweep signal, the processor 56 at $T_1$ signals the pulse generator 70 via the lines 82 and 82b to generate a pulse signal having a predetermined duration of, or width, from $T_1$ to $T_3$ (see $W_9$). The pulse signal is received as write-enable input to the OR gate 76 via the line 80 for enabling the head drive 58 through $T_1$ and until $T_3$. The pulse signal is also received by the sweep generator 72 via the line 90 where the sweep generator 72 is triggered to transmit a sweep signal during the pulse signal. Received as write-data input to the Exclusive-OR gate 74, the sweep signal via the line 92 is amplified by the head drive 58 for degaussing the head 32.

As shown in FIG. 5A, the frequency of the sweep signal begins at the normal data interval, L, thereafter increases in frequency (or decreasing in interval such that $L_{i-1} > L_i$), and finally attains a predetermined frequency (or interval $L_n$) that exceeds the response frequency of the head 32. Because of its inductance, the head 32 is left substantially degaussed at the time $T_3$. To accomplish the degaussing, the sweep signal may range substantially from 500 Hz to 25 KHz. Again, note that the intervals $L_i$ as shown in FIG. 5A are not to scale, but rather, merely illustrative of the waveform involved.

As shown in FIG. 5A, time $T_3$ represents the conclusion of the degaussing operation where the processor 56 may initiate a reading operation for verifying the fresh data stored on the magnetic stripe 12.

From the above explanation, it may be seen that the system of the present invention may be readily incorporated in various embodiments to accomplish degaussing of the magnetic transducers. Of course, various alternative techniques, especially various alternative logic circuitry, may be employed departing from those disclosed and suggested herein; consequently, it is to be understood that the scope hereof should be determined in accordance with the claims as set forth below.

What is claimed is:

1. A degausser for diminishing residual magnetism on a magnetic transducer for processing a magnetic stripe of a card, including a write operation leaving a residual polarity on said magnetic transducer corresponding to a polarity of a recorded signal, said degausser comprising:
   means for sensing a conclusion of said write operation on said magnetic stripe of said card, said means for sensing comprising a means for sensing a position of said magnetic transducer relative to said card and providing a signal indicative of said position; and
   means responsive to said said signal indicative of said position and said polarity of said recorded signal, for applying to said magnetic transducer, a pulse opposite in polarity to said residual polarity, for a predetermined duration of time.

2. A degausser for diminishing residual magnetism on a magnetic transducer for processing a magnetic stripe of a card, wherein said magnetic transducer has a predetermined frequency response, said degausser comprising:
   means for sensing conclusion of a write operation; and
   means responsive to said sensing means, for applying to said magnetic transducer, a sweep signal having a range in frequency which begins at a normal data interval, and attains a frequency that exceeds said frequency response of said magnetic transducer.

3. A degausser as provided in claim 2 wherein said means for applying a sweep signal include a sweep generator for providing said sweep signal.

4. A magnetic card processing system for transducing a magnetic stripe of a magnetic card, said system comprising:
   a transducer for communicating a signal having a polarity with said magnetic stripe;
   means for moving said transducer relative to said magnetic stripe to accomplish transducing operations, including recording said magnetic stripe; and
   degaussing means responsive to said polarity of said communicated signal for diminishing residual magnetism of said transducer subsequent to recording said magnetic stripe.

5. A magnetic card transducing system as provided in claim 4, wherein said degaussing means apply a pulse opposite in polarity to a residual polarity on said transducer, for a predetermined duration of time.

6. A magnetic card transducing system as provided in claim 5, wherein said degaussing means apply a sweep signal having a range in frequency which begins at a normal data interval, and attains a frequency that exceeds frequency response of said transducer.

7. A magnetic card transducing system as provided in claim 4, wherein said degaussing means include means for sensing completion of moving said transducer relative to said magnetic stripe.

8. A magnetic card transducing system as provided in claim 2, further including processing means coupled to said transducer to accomplish the processing of said magnetic card.

* * * * *

UNITED STATES PATENT AND TRADEMARK OFFICE
CERTIFICATE OF CORRECTION

PATENT NO. : 5,396,369
DATED : March 7, 1995
INVENTOR(S) : Robert S. Deland, Jr.

It is certified that error appears in the above-indentified patent and that said Letters Patent is hereby corrected as shown below:

Column 4, line 17, "relations" should be --relation--;

Column 5, line 40, "Or" should be --OR-- in both instances;

Column 8, line 9, insert a space after "$W_{10}$";

Column 8, line 25, "Exclusive-Or" should be --Exclusive-OR--;

Column 9, line 20, after "to said", delete "said"; and

Signed and Sealed this

Twenty-sixth Day of September, 1995

Attest:

BRUCE LEHMAN

*Attesting Officer*     *Commissioner of Patents and Trademarks*

UNITED STATES PATENT AND TRADEMARK OFFICE
CERTIFICATE OF CORRECTION

PATENT NO. : 5,396,369
DATED : March 7, 1995
INVENTOR(S) : Robert S. Deland, Jr.

It is certified that error appears in the above-indentified patent and that said Letters Patent is hereby corrected as shown below:

Column 10, lines 22-26, delete claim 6 and insert the following:

6. A magnetic card processing system for transducing a magnetic stripe of a magnetic card, said system comprising:

a transducer for communicating a signal having a last polarity with said magnetic stripe;

means for moving said transducer relative to said magnetic stripe to accomplish transducing operations, including recording on said magnetic stripe; and degausing means responsive to said last polarity of said communicated signal for diminishing residual magnetism of said transducer subsequent to recording said magnetic stripe, said degaussing means applying a sweep signal having a range in frequency which begins at a normal data interval, and attains a frequency that exeeds frequency response of said transducer.

Signed and Sealed this

Twenty-third Day of January, 1996

Attest:

BRUCE LEHMAN

Attesting Officer

Commissioner of Patents and Trademarks